Nov. 12, 1929.                S. L. DAVIS                 1,735,735
                               INDICATOR
                          Filed Jan. 28, 1929        2 Sheets-Sheet 1

Samuel L. Davis,
INVENTOR
BY Victor J. Evans
ATTORNEY

WITNESS:

Nov. 12, 1929.                    S. L. DAVIS                     1,735,735
                                   INDICATOR
                              Filed Jan. 28, 1929            2 Sheets-Sheet 2
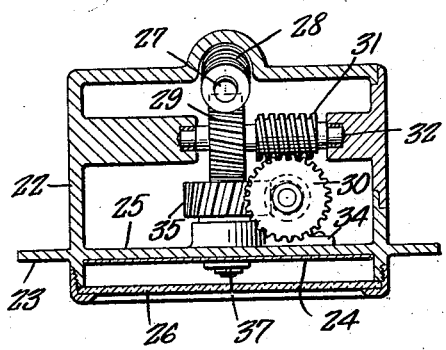
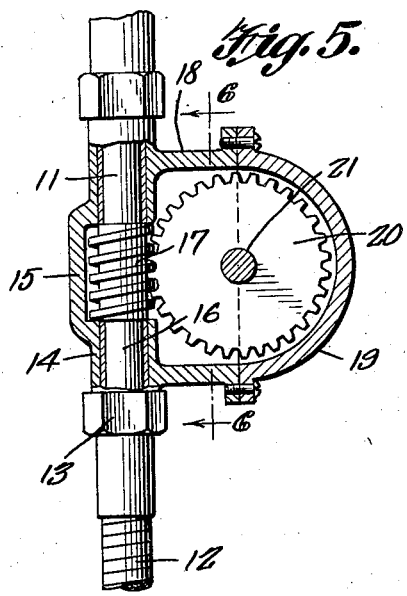
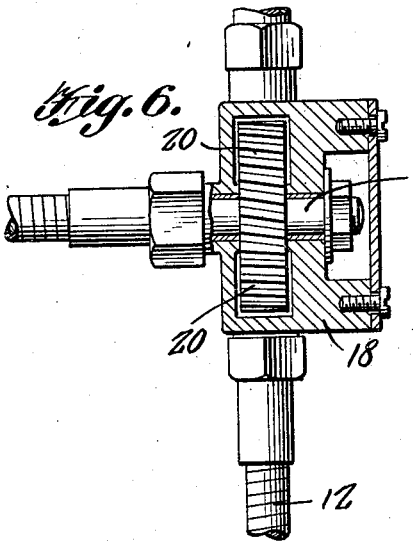
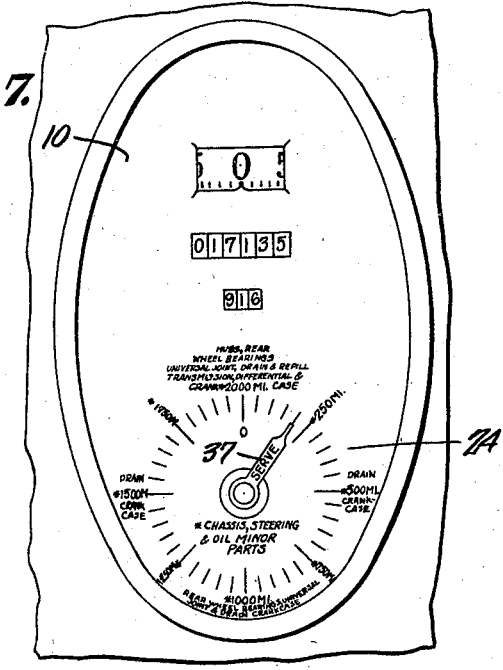
Samuel L. Davis, INVENTOR
BY Victor J. Evans
ATTORNEY
WITNESS:

Patented Nov. 12, 1929

1,735,735

UNITED STATES PATENT OFFICE

SAMUEL L. DAVIS, OF GURDON, ARKANSAS

INDICATOR

Application filed January 28, 1929. Serial No. 335,566.

This invention relates to indicating devices adapted for connection in conjunction with speedometers and the like to inform the driver of a vehicle when the chassis should be greased, the oil should be changed in the crank case, the transmission and differential flushed and refilled, etc., at regular intervals in order that the vehicle may be maintained in proper running condition.

An object of the invention consists in the provision of a driving connection carried by the indicating device and operable from the drive mechanism of the vehicle speedometer.

More specifically stated, the indicating device is provided with a dial and indicating hand calibrated or otherwise identified with proper legends to indicate the distance traveled and the different parts of the vehicle which require lubricant inspection at predetermined and regular distances.

With the above and other objects in view, the invention further consists of the following novel features and details of construction, to be hereinafter more fully described, illustrated in the accompanying drawings and pointed out in the appended claims.

In the drawings:—

Figure 4 is a sectional view taken on line 4—4 of Figure 2.

Figure 5 is a longitudinal sectional view taken through the adjacent portions of the drive mechanisms for the indicating and operating cable for the speedometer.

Figure 6 is a sectional view taken on line 6—6 of Figure 5.

Figure 7 is a fragmentary elevation of the instrument panel showing a combined face panel for both the speedometer and indicating device.

Figure 1:
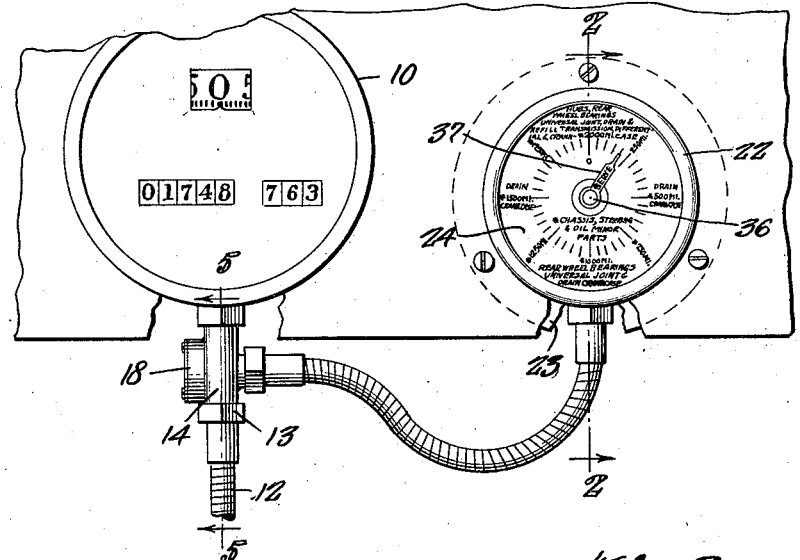
Figure 1 is an elevation of a motor vehicle speedometer and indicating device illustrating the driving connections therebetween.
Figure 2:
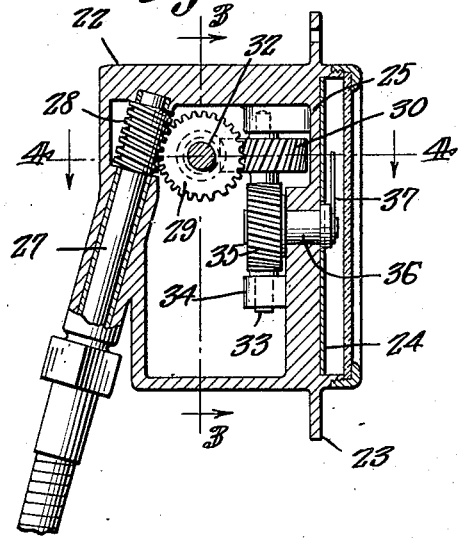
Figure 2 is a vertical sectional view taken on line 2—2 of Figure 1.
Figure 3:
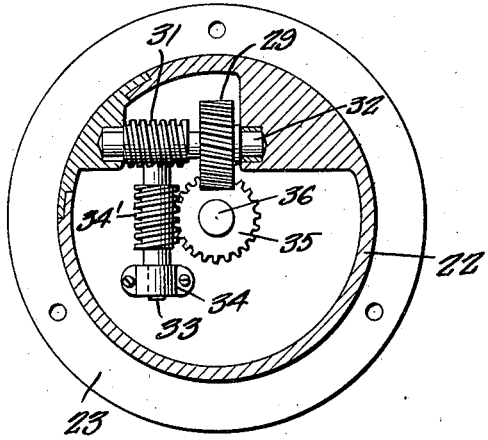
Figure 3 is a sectional view taken on line 3—3 of Figure 2.

Referring to the drawings in detail wherein like characters of reference denote corresponding parts, the reference character 10 indicates generally the conventional form of motor vehicle speedometer having a stub shaft 11 extended from the housing therefor. Ordinarily, a conduit or housing, such as indicated at 12, and including a joint or fitting 13, is adapted to be brought into engagement with the aforementioned housing to connect the adjacent end of the flexible driving shaft within the conduit with the aforementioned end of the stub shaft. In the application of the present invention therewith, it is necessary to employ a sleeve member 14 having a bulge 15 at an appropriate point in the length thereof. A shaft member 16, rotatably mounted within the sleeve 14, is adapted for connection at its ends with the stub shaft 11 and the driving cable, not shown, within the conduit 12. A worm 17, carried by the shaft 16, is adapted for operation within the bulged portion 15 of the sleeve 14, substantially as illustrated in Figure 5 of the drawings.

A housing 18, carried by the sleeve 14 and having communication with the bulged portion 15 therefor, is provided with a removably secured cover plate 19. A worm gear 20 upon a shaft 21 having its ends journaled within the housing, is meshingly engaged tangentially thereof with the teeth of the worm 17 whereby a driving connection is established between the driving mechanism for the vehicle speedometer and the indicating device.

The indicating device comprises a housing 22 of cylindrical drum shape, and having an annular attaching flange 23 adjacent one end for connection with the instrument panel of the vehicle within the line of vision of the vehicle driver. A dial 24, carried upon the outer face of a partition wall 25 within the housing 22 and bearing suitable indicia and other memoranda relating to distances traveled and lubrication required, is covered by a transparent panel 26 carried by the housing. The shaft 21 for the worm gear 20 is adapted for ultimate connection with a driven shaft 27 which includes a worm 28 upon the end thereof extended within the housing 22 for meshing engagement with a spiral cut worm gear 29. A companion worm gear 30, disposed at right angles to the worm gear 29, is meshingly engaged with a worm portion 31 included upon the axle 32 for the worm gear 29. The ends of the axle 32 are journaled between the ends of flange portions projecting from the inner side wall of the housing. The axle or shaft 33 for the companion worm gear 30 is journaled at one end within a block included within the housing and a bearing member 34 arranged upon the inner surface of the partition 25. The shaft or axle 33 also includes a worm portion 34' engageable with a gear 35 operating a shaft 36 projecting at right angles through the center of the partition 25 and dial 24. A pointer hand 37, carried upon the outermost projecting end of the shaft 36 is adapted for selective and periodic registration with the calibrations and other indicia upon the face of the dial.

From the illustration of my invention in Figure 7 of the drawings, it is obviously apparent that the two instruments, namely, the speedometer and indicating device may be arranged in such manner that only one dial or cover plate is necessary.

It is thought that the present invention affords an effective means for ascertaining by prescribed running intervals, when the various working parts and units of motor vehicles should be checked and inspected to effectively maintain and prolong the life of the vehicle by lubrication at stated intervals.

The invention is susceptible of various changes in its form, proportions and minor details of construction, to be hereinafter more fully described, illustrated in the accompanying drawings and pointed out in the appended claims.

Having thus described the invention, what is claimed is:—

1. An indicating device comprising a housing having a partition spaced from one end thereof, a dial lying flush with the adjacent side of the partition and having calibrations and indicia thereon relative to the various parts and units of a motor vehicle to be lubricated at prescribed intervals, a shaft extended centrally of the partition and dial having a worm gear upon that end within the housing, a pointer hand carried upon the outermost projecting end of the shaft to be moved across the face of the dial, an axle vertically disposed with relation to and to one side of said shaft having a worm portion meshingly engaged with the worm gear, a worm gear carried upon the opposite end of the axle, a companion horizontally disposed axle having a worm portion upon one end engageable with the worm gear of the vertically disposed axle and a worm gear upon its opposite end, and a driven shaft extended within the housing having a worm portion engageable with the worm gear of the companion horizontally disposed axle.

2. The combination of an indicator and vehicle speedometer comprising a housing, an operating mechanism included within the housing, a connecting element establishing driving connection between the speedometer cable and operating mechanism in the housing, a partition arranged adjacent one end of the housing, a dial carried by the partition having a lubrication chart thereon, and a shaft extended through the partition and dial including a pointer hand upon one end operable across the face of the dial and operatively engaged at its opposite end with the operating mechanism within the housing.

In testimony whereof I affix my signature.

SAMUEL L. DAVIS.